(12) United States Patent
Malthouse

(10) Patent No.: US 6,871,080 B2
(45) Date of Patent: Mar. 22, 2005

(54) SMART CARD READER MODULE

(75) Inventor: Ian Malthouse, Aldershot (GB)

(73) Assignee: Nokia Corporation, Espoo (FI)

( * ) Notice: Subject to any disclaimer, the term of this patent is extended or adjusted under 35 U.S.C. 154(b) by 539 days.

(21) Appl. No.: 09/955,326

(22) Filed: Sep. 18, 2001

(65) Prior Publication Data

US 2002/0039910 A1 Apr. 4, 2002

(30) Foreign Application Priority Data

Oct. 3, 2000 (GB) .............................................. 0024201

(51) Int. Cl.$^7$ .............................................. H04M 1/00
(52) U.S. Cl. ..................... 455/558; 455/550.1; 235/486
(58) Field of Search ................................. 455/558, 347, 455/351, 550.1, 557; 379/357.01; 235/441, 479, 486

(56) References Cited

U.S. PATENT DOCUMENTS

| | | | |
|---|---|---|---|
| 4,717,817 A | | 1/1988 | Grassl et al. |
| 5,597,316 A | | 1/1997 | David et al. |
| 5,640,307 A | | 6/1997 | Bleier et al. |
| 6,138,916 A | * | 10/2000 | Zolkos et al. ............... 235/475 |
| 6,665,544 B1 | * | 12/2003 | Michel et al. .............. 455/558 |

FOREIGN PATENT DOCUMENTS

| | | |
|---|---|---|
| DE | 3916783 | 4/1990 |
| EP | 0167356 | 1/1986 |
| EP | 0282296 | 9/1988 |
| EP | 0745949 | 12/1996 |
| EP | 0947944 | 10/1999 |
| EP | 1035497 | 9/2000 |
| GB | 2124420 | 2/1984 |

OTHER PUBLICATIONS

"The GSM System for Mobile Communications," by M. Mouly and M. B. Pautet, Sell & Sys, 1992, pp. 67–71.

* cited by examiner

Primary Examiner—Melur Ramakrishnaiah
(74) Attorney, Agent, or Firm—Alfred A. Fressola; Ware, Fressola, Van Der Sluys & Adolphson LLP

(57) ABSTRACT

A smart card reader module is disclosed and it includes a biasing member (36,39) for ejecting a smart card (27) inserted into the module against a bias provided by the biasing member (36,39) and a locking member (46) to retain an inserted smart card (27) in the module, the biasing member (36,39) being operable to eject a smart card (27) from the module on release of the locking member (46). The smart card reader module is particularly intended for use in mobile telecommunications apparatus (1) for mounting a Subscriber Identification Module (SIM) card.

26 Claims, 6 Drawing Sheets

SMART CARD READER MODULE

FIELD OF THE INVENTION

The present invention relates to a smart card reader module and, in particular, to a module for securing a Subscriber Identification Module (SIM) into a mobile telecommunications device that incorporates contacts that must be maintained in contact with corresponding conductive elements on the card.

BACKGROUND TO THE INVENTION

A smart card is a plastic card that incorporates an embedded semi-conductor which lets it accept, send and store information and they are used in a variety of applications including mobile telephones, cash-less payment systems and user identification.

Smart cards typically fall into two general categories: contact and contactless. The chip communicates either directly via a physical contact or remotely via a contactless electromagnetic interface. The present invention is concerned with contact smart cards which must be inserted into smart card readers, which incorporate contacts that touch a conductive module on the surface of the card. Data, algorithm and other information are transmitted via the physical contacts.

The value of smart cards lies in their capability to store personal information with a high degree of security and portability. They are therefore ideal medium for the storage of private passwords, account numbers and other forms of personal data. In mobile telephones conforming to the Global System for Mobile Communications (GSM) recommendations, a smart card is generally referred to as a subscriber identification module (SIM) card. The SIM card holds a subscriber's identity number, security information and memory for a personal directory of telephone numbers. An overview of SIM cards is given in "The GSM System for Mobile Communications" by M. Mouly & M. B. Pautet, Sell & Sys, 1992 (ISBN-9507190-0-7), pp 67–71.

It is desirable to provide a smart card reader module which is reliable in operation and allows for simple insertion and release of a smart card.

SUMMARY OF THE INVENTION

According to the present invention, there is provided a smart card reader module comprising a biasing member to eject a smart card inserted into the module and a locking member to retain an inserted smart card in the module, the biasing member being operable to eject a smart card from the module on release of the locking member.

Preferably, the module includes a chassis having a chamber therein and a slot to enable insertion of a smart card into the chamber.

The biasing means preferably includes an actuator and a spring, the arrangement being such that a partially inserted card contacts one end of the actuator, further insertion of the card causing the actuator to move with the card and thereby compress the spring to bias the card in a direction against the direction of insertion.

The actuator and spring are conveniently disposed in an elongate cavity in the chassis, said one end of the actuator protruding from the cavity into the chamber.

The spring may be a compression spring.

In a preferred embodiment, the locking member is mounted to a resilient latch arm.

Preferably, the latch arm is resiliently deformed in response to the pressure of a card on the locking member during insertion, the locking member being deflected by the card to allow insertion thereof into the chamber.

The resilience of the latch arm preferably returns the locking member to its original position when the pressure applied thereto by a card is removed.

In a preferred embodiment, the locking member comprises a release button and a card engaging arm extending laterally therefrom into the chamber.

Preferably, the locking member is deflected in response to pressure of a card on a leading edge of the card engaging arm during insertion.

The locking member is conveniently positioned in a cut out in the chassis.

In a preferred embodiment, the leading edge of the card engaging arm to which pressure is applied by a card is bevelled such that the card deflects the card engaging arm against the bias provided by the resiliently deformable latch arm to allow the card to pass over the card engaging arm during insertion.

The module is advantageously configured such that when a card has been fully inserted, it clears the card engaging arm, the resilience of the latch arm causing the locking member to return to its original position such that the card is retained in the module by the locking member.

The present invention preferably includes a smart card having a chamfered corner portion, the card engaging arm having an angled card engaging face configured such that when the card is inserted and the chamfered corner clears the card engaging portion, the locking member returns to its original position such that the angled card engaging face engages the chamfered corner to lock the card in the module, the arrangement being such that the card does not clear the card engaging arm when inserted in any other orientation.

The smart card is preferably a subscriber identification module (SIM).

The reader module is preferably configured such that the resilient latch arm is deformed in response to pressure on the button to deflect the card engaging arm out of the chamber thereby releasing the card from the module.

The latch arm is conveniently integral with the cover plate.

The present invention also includes a mobile telecommunications device incorporating a smart card reader module according to the invention.

The mobile telephone of the invention preferably includes a casing and a battery pack, a smart card being inserted into the module through an opening in the casing.

DETAILED DESCRIPTION OF THE PREFERRED EMBODIMENTS

Embodiments of the present invention will now be described, by way of example only, with reference to the accompanying drawings.

Figure 1:
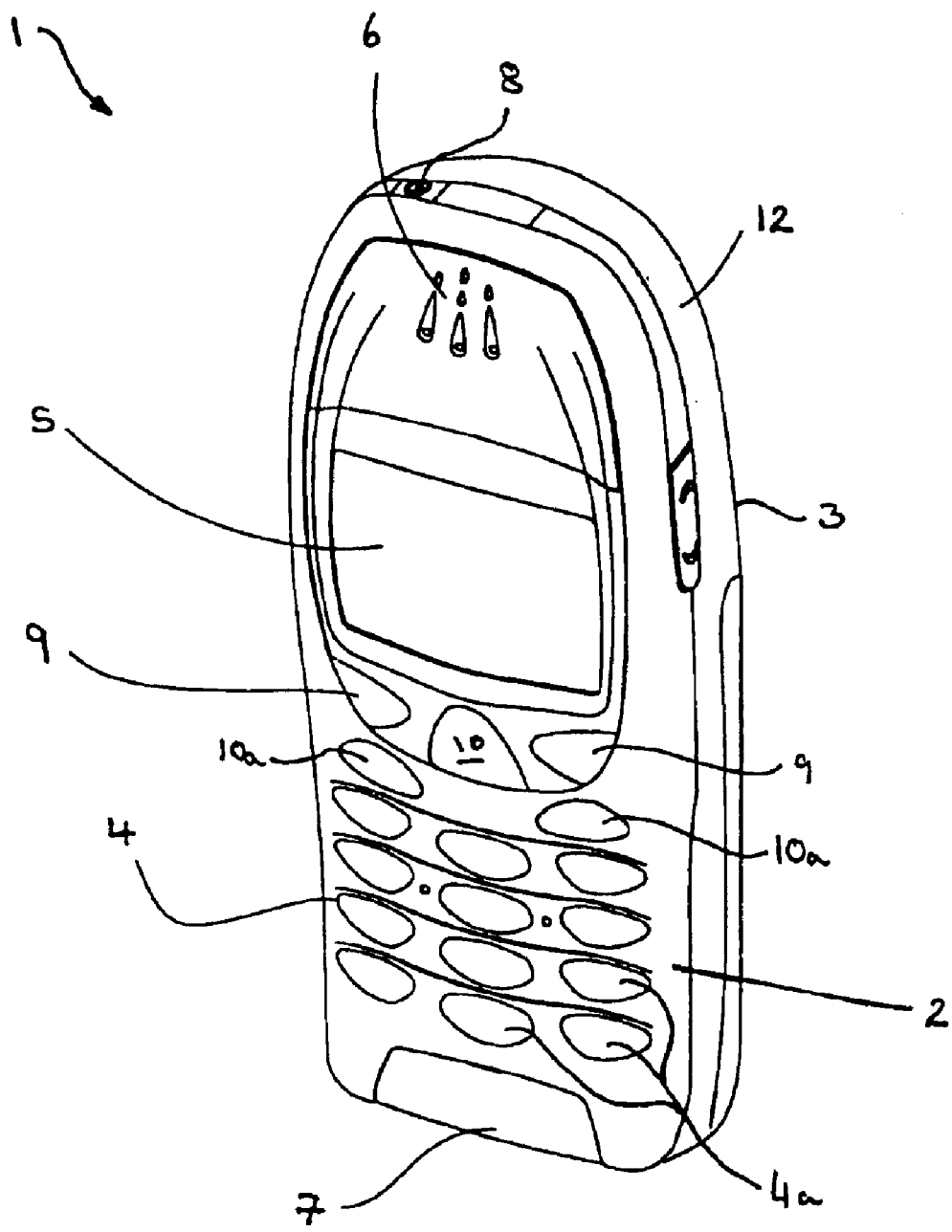
FIG. 1 is an illustration showing a perspective front view of a mobile telephone.

The general components and operation 1 of a mobile telephone 1 will now be described with reference to FIGS. 1 and 2. The telephone 1 has a front face 2 and rear face 3 and comprises a user interface having a keypad 4, a display 5, an ear piece 6, a microphone 7 and an on/off key 8. The telephone 1 is adapted for communication via a wireless telecommunications network, e.g. a cellular network. However, the telephone 1 could also have been designed for a cordless network. The keypad 4 has a first group of keys which are alphanumeric and by means of which a user can enter a telephone number, write a text message (SMS) or write a name associated with a particular number, etc.

The keypad 4 additionally includes two soft keys 9, the functionality of which depends on the state of the telephone and the navigation in the menu by means of a navigation key 10, and two call handling keys 10a which can be used for establishing a call or a conference call, terminating a call or rejecting an incoming call.

Figure 2:
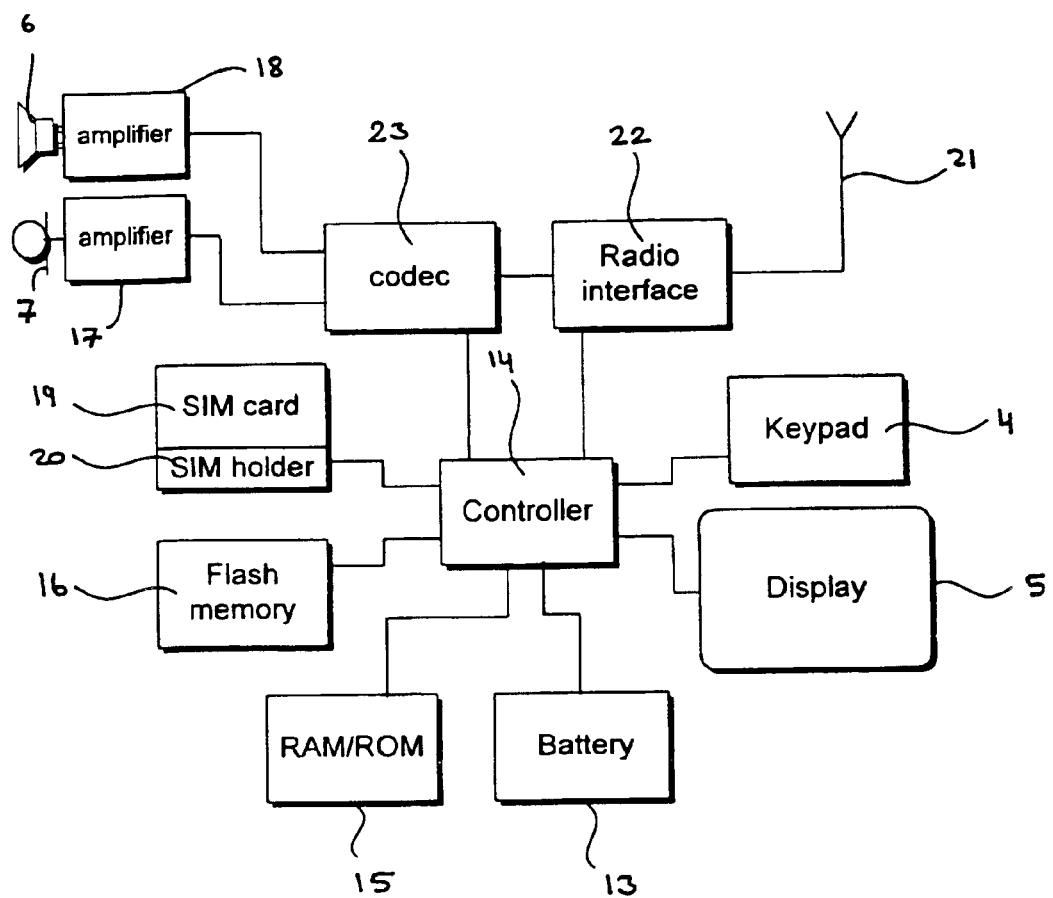
FIG. 2 is a schematic illustration the main components of the mobile telephone shown in FIGS. 1 for connection to a cellular or cordless network.

FIG. 2 illustrates the main parts of the telephone 1 which is adapted for use in connection with a GSM network or any other mobile telephone network and may also be configured to meet the wireless application protocol specification (WAP). The telephone is driven by a removable battery pack 13. Signal processing is carried out under the control of a digital micro-controller 14 which has an associated RAM/ROM 15 and a flash memory 16. Electric analogue audio signals are produced by microphone 7 and amplified by pre-amplifier 17. Similarly, analogue audio signals are fed to ear piece 6 through amplifier 18. The micro-controller 14 receives instruction signals from the keypad 4 including the soft keys 9 and navigation key 10 and controls the operation of the display 5.

Information concerning the identity of a user is held on a smart card 19 in the form of a GSM SIM card. The SIM card 16 is removably received in a SIM card holder 20. Radio signals are transmitted and received by means of an antenna 21 connected through an rf stage 22 to a codec 23 configured to process signals under the control of the micro-controller 14. Thus, in use, for speech, the codec 23 receives analogue signals from microphone amplifier 17, digitises them into a form suitable for transmission and feeds them to the rf stage 22 for transmission through antenna element 21 to the public land mobile network (PLMN). Similarly, received signals are fed through the antenna element 21 to be demodulated by the rf stage 22 and fed to codec 23 so as to produce analogue signals fed to amplifier 18 and ear piece 6.

An example of a SIM card holder 20 in accordance with the present invention will now be described in detail with reference to FIGS. 3 to 7.

Figure 3:
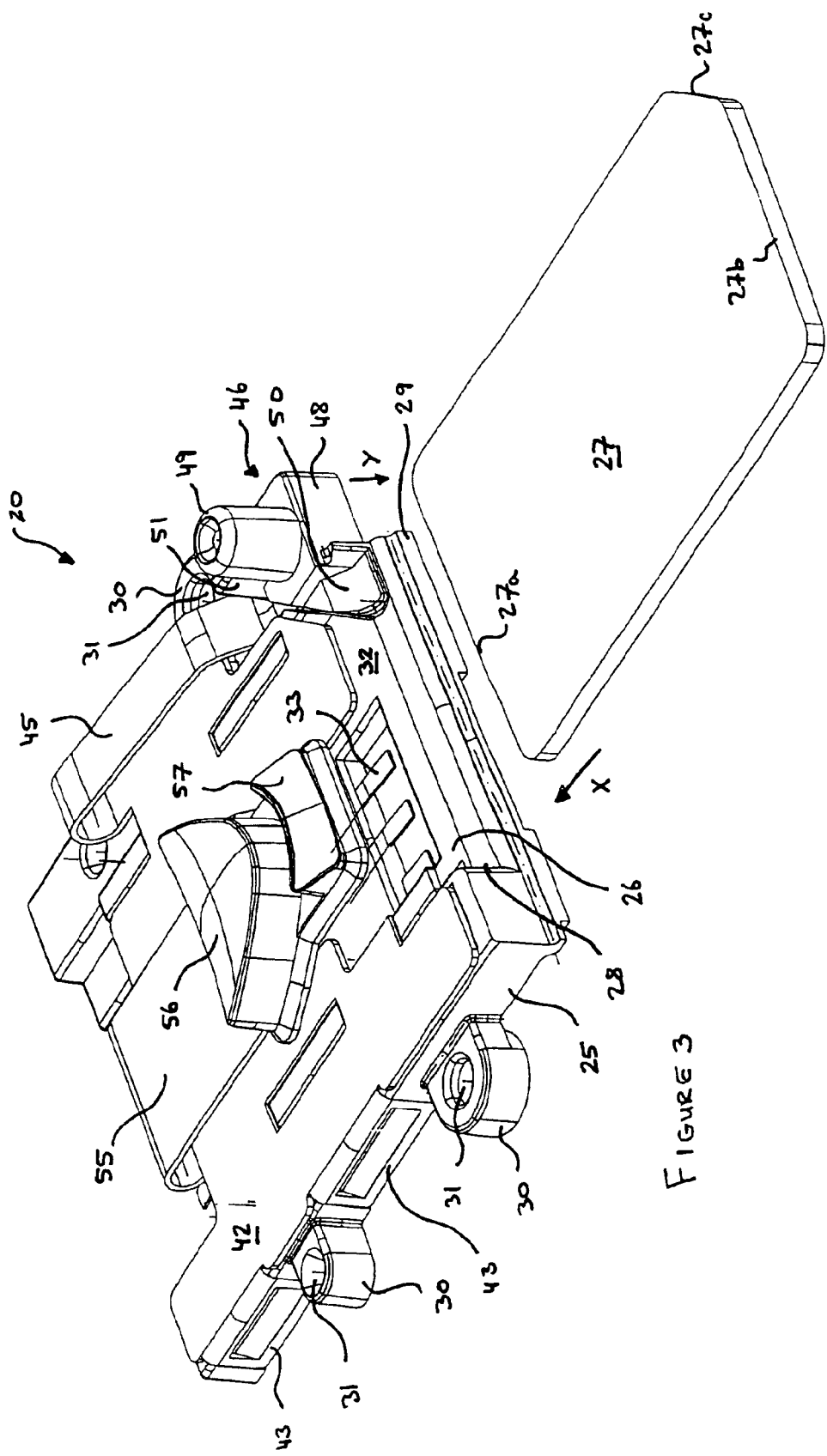
FIG. 3 is a perspective view of a smart card reader module for mounting in the telephone illustrated in FIGS. 1 and 2.
Figure 4:
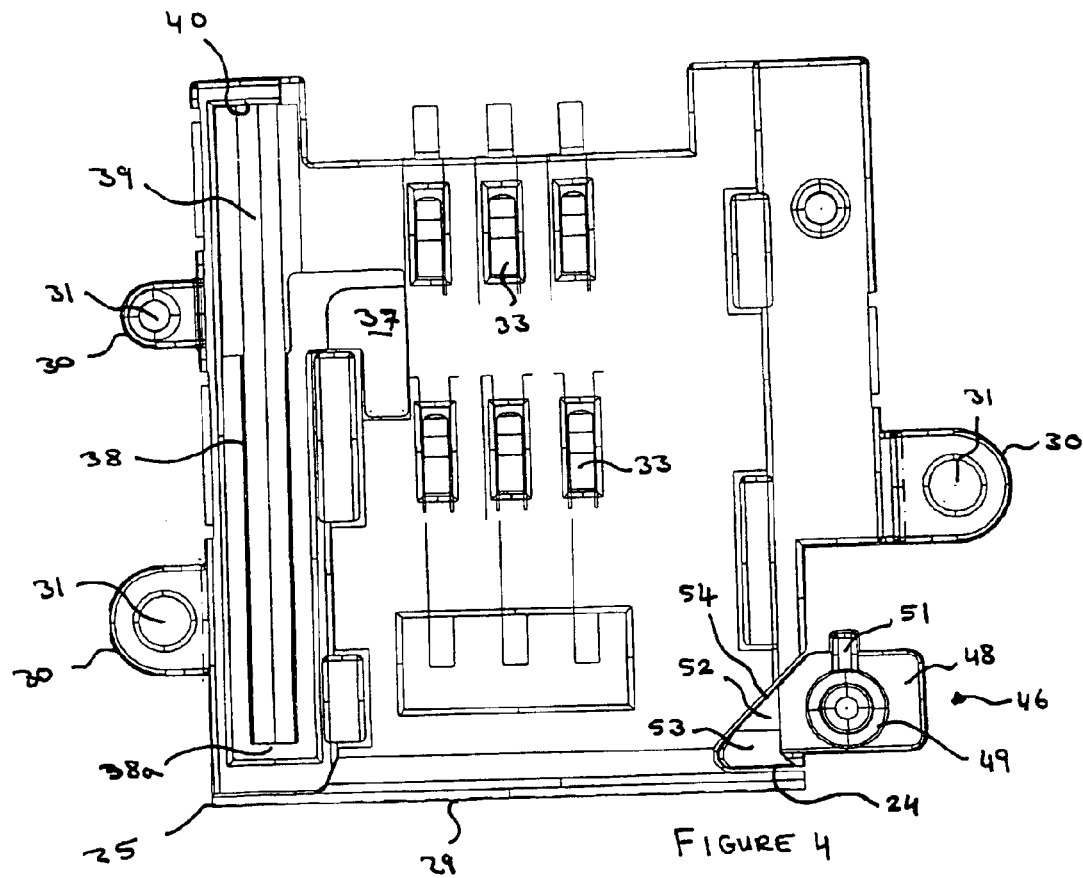
FIG. 4 is a top plan view of the chassis of the smart card reader shown in FIG. 3.

A perspective view of the SIM card holder 20 is shown in FIG. 3 and comprises a chassis 25 having a chamber 26 therein to receive a SIM card 27 (corresponding to the SIM card 19 shown in FIG. 2) through a slot 28 in the front face 29 of the chassis 25. The chassis 25 includes four mounting flanges 30 having apertures 31 therethrough for the passage of fasteners (not shown) to enable the chassis 25 to be mounted to the inside of an electronic apparatus such as the mobile telephone 1 described with reference to FIGS. 1 and 2. The chassis 25 has a bottom wall 32 that is provided with a plurality of terminals 33 to connect the electronic circuitry of the telephone 1 with a conductive module (not shown) embedded in the underside of the SIM card 27 when inserted into the chamber 26 through the slot 28 in the direction of arrow X in FIG. 3. The chassis 25 also has a cut out region 24 adjacent to the slot 28 in the front face 29 in which a locking member 46 is disposed for engagement with an inserted SIM card 27. The SIM card 27 has a leading edge 27a and a trailing edge 27b. One corner 27c of the trailing edge 27b is cropped or chamfered. The locking member 46 and the interaction between it and a SIM card 27 will be described hereinafter.

Figure 6:
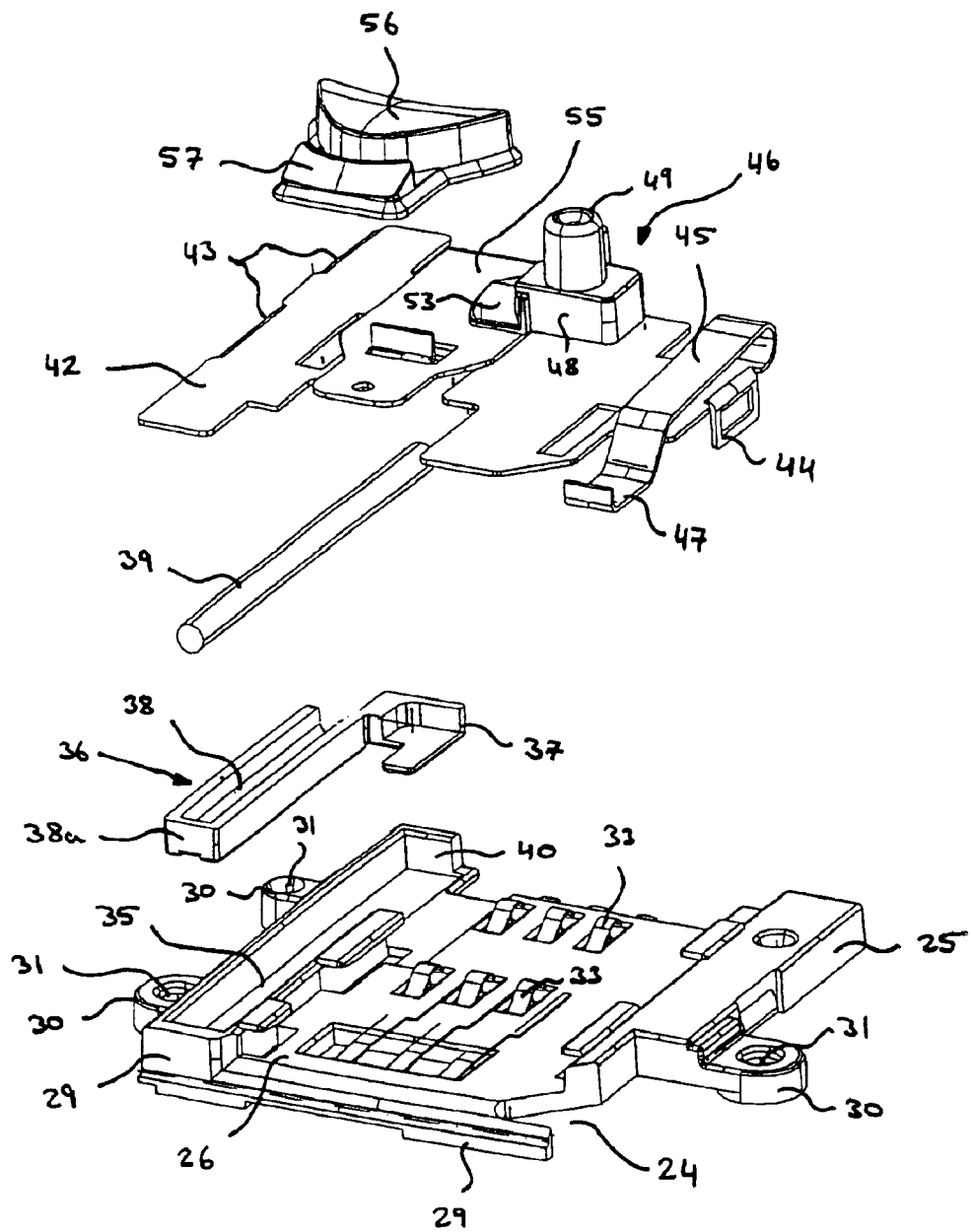
FIG. 6 is an exploded perspective view of the smart card reader shown in FIGS. 3 and 4.
Figure 7:
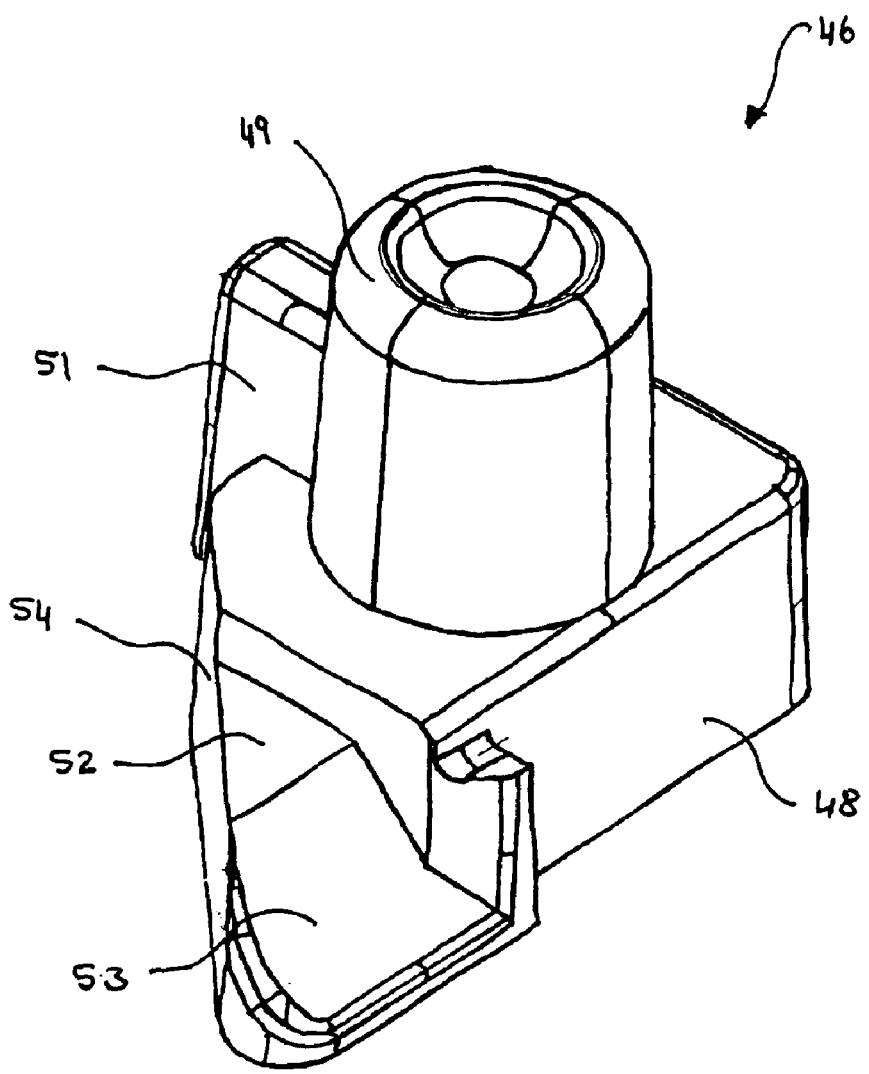
FIG. 7 is a perspective view of the locking member forming part of the smart card reader module shown in FIGS. 3, 4 and 6.

As can be seen most clearly in FIG. 6, the chassis 25 includes a cavity 35 extending from the front face 29 of the chassis 25 alongside the chamber 26. A spring holder 36 is disposed within the cavity 35 and includes a card engaging portion 37 that protrudes into the chamber 26 and an elongate recess 38 to receive a compression spring 39. The spring 39 is constrained between a shoulder 40 integrally formed on the chassis 25 and the end 38a of the elongate recess 38 of the spring holder 36. The spring holder 36 is slideable in the cavity 35 against a bias provided by the compression spring 39.

A plate 42 is mounted on the chassis 25 and covers the cavity 35 containing the spring holder 36 and spring 39 as well as forming the top wall of the chamber 26. The plate 42 extends over the chassis 25 and has edge portions 43, 44 which are folded downwardly over the side walls of the chassis 25. A portion of the plate extending over the surface of the chassis 25 is folded back on itself to form a resiliently deflectable latch spring arm 45 having a hooked end part 47 that terminates in the cut out region 24 below the level of the slot 28.

The locking member 46 is mounted on the hooked end part 47 of the latch spring arm 45 and fits within the cut out region 24. The locking member 46 includes a base part 48, a actuator button 49 upstanding from the base part 48, and a card engaging arm 50 extending laterally from the base part 48 into the chamber 26. The actuator button 49 has a protrusion 51 which rests on the hooked end part 47 of the latch spring arm 45, as will be apparent from FIG. 5.

The card engaging arm 50 is integrally formed with the locking member 46 and has a flat upper surface 52 and a bevelled or angled leading edge face 53. The rear edge is cut at an angle to present an angled locking face 54 and the reason for this will become apparent.

The plate 42 includes a further central section also bent back on itself over the chassis 25 to form a resiliently deflectable arm 55. A battery pack release button 56 is mounted on the end of this arm and incorporates a latch member 57 that cooperates with the battery pack 13 (not shown in FIGS. 3 to 7) to lock it in position on the telephone 1. To remove the battery pack 13, the user presses the button 56 which disengages the latch 57 from the battery pack 13 which can then be removed. Release of the button 56 causes it to return to its original position due to the resilience of the arm 55.

The method of operation of the SIM card holder will now be described. A SIM card 27 is inserted through the slot 28 in the direction of arrow X in FIG. 3 with its leading edge 27a to the front and with the cropped corner 27c of the trailing edge 27b to the rear and to the right when looking at the front face 29 of the chassis 25. To insert the card 27, pressure must be applied with the leading edge 27a to the angled leading edge face 53 of the card engaging arm 50 to deflect the locking member 46 downwardly in the direction of arrow Y in FIG. 3 and against the bias provided by the resiliently deformable latch spring arm 45, thereby allowing the card 27 to pass over the card engaging arm 50 into the chamber 26. It will be appreciated that the locking member 46 is easily deflected to allow insertion of the card 27 due to the angled leading edge face 53 on the card engaging arm 50. When the card 27 has been fully inserted into the chamber 26, the length of the chamber 26 is such that the chamfered corner 27c just clears the card engaging arm 50 of the locking member 46 and the resilience of the spring latch arm 45 causes it to return to its original position in which the card engaging arm 50 extends into the chamber 26. The locking face 54 is angled to correspond to the angle of the chamfered or cropped corner 27c of the SIM card 27 so that if the SIM card 27 is inserted in any other orientation, the unchamfered corner of the card 27 will not clear the card engaging arm 50 when fully inserted into the chamber 26, so the locking member 46 will not return to its original position.

When the SIM card 27 has been partially inserted into the chamber 26, the leading edge 27a of the SIM card 27 contacts the card engaging portion 37 protruding into the chamber 26 on the end of the spring holder 38. Further insertion of the card 27 causes the spring holder 38 to slide in the cavity 35 together with the card 27 and compress the spring 39 thereby biasing the card 27 against its direction of insertion. Therefore, the card 27 is automatically or self-biased in a direction opposite to that in which it is being inserted during insertion of the card 27. The person inserting the card 27 must apply sufficient pressure to it when contact with the card engaging portion 37 has been made to compress the spring 39 and bias the card 27 in the direction opposite to that in which it is being inserted. When the card 27 has been fully inserted in the correct orientation, the locking member 46 returns to its original position due to the resilience of the latch arm 45 and the card 27 is retained in the chamber 26 upon release by the person inserting it as the trailing edge 27b of the card 27 is biased against the angled locking face 54 by the spring holder 38 and spring 39. If the card 27 has been inserted in an incorrect orientation, the locking member 46 does not return to its original location when the card 27 has been fully inserted, as it cannot be inserted far enough into the module so that it clears the card engaging arm 50. Therefore, when the card 27 is released by the person inserting it, it is not retained against the angled locking face 54 of the locking means 46 but is ejected by the bias. This ensures that the card 27 will not be retained in the chamber 26 when it is inserted in an incorrect orientation and automatically ejects it when released, to enable the user to re-insert it in the correct orientation.

Figure 5:
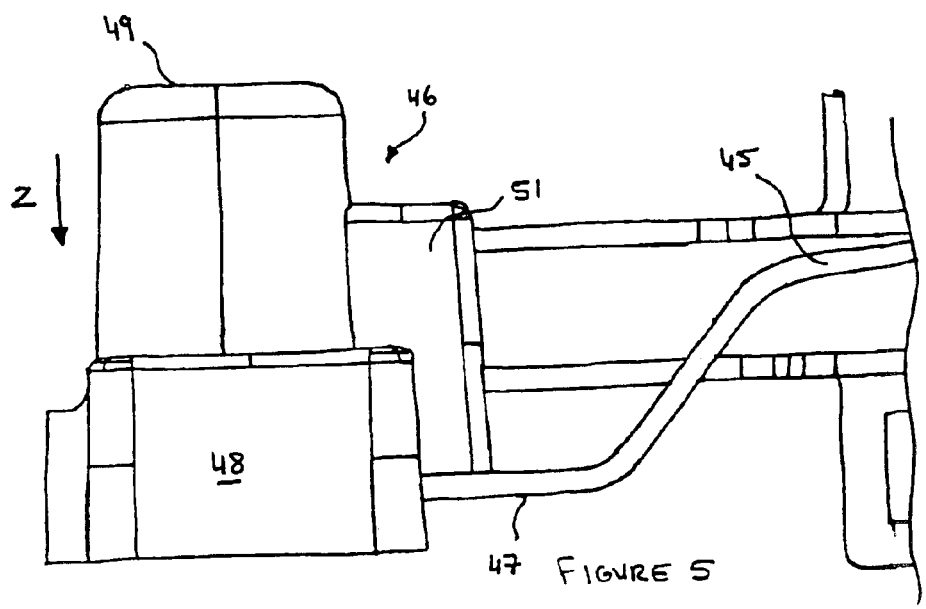
FIG. 5 is a side elevation of the locking member and a portion of the smart card reader module shown in FIG. 4.

When a card 27 that has been correctly inserted is to be removed, the user presses the actuator button 49 downwardly in the direction as shown by arrow Z in FIG. 5 to deflect the latch arm 45 so that the card engaging arm 50 is no longer blocking the passage of the card 27 from the chamber 26. When the button 49 is depressed, the spring holder 38 and spring 39 ejects the card 27 from the chamber 26.

In a preferred arrangement, the spring 39 has a sufficient compressive force to only partially eject the card 27 from the module so that approximately 8 mm of the card 27 protrudes from the slot 28. This enables the end of the card 27 near to the to trailing edge 27b to be held between the fingers so that it can be removed from the module easily.

The actuator button 49 extends through an aperture (not shown) in the telephone housing. To prevent accidental actuation of the button 49 and ejection of the smart card 27 from the module, the module is located so that the slot 28 faces the end of the battery pack 13 so that the battery pack 13 must be removed before access to the slot 28 can be obtained. If the button 49 is pressed while the battery pack 13 is in position, the card 27 will not be ejected from the module as it is prevented from doing so by the battery pack 13.

Many modifications and variations of the invention falling within the terms of the following claims will be apparent to those skilled in the art and the foregoing description should be regarded as a description of the preferred embodiments only. For example, the reader may be installed in apparatus other than a mobile telephone such as a personal digital assistant.

What is claimed is:

1. A smart card reader module comprising:
    a biasing member to eject a smart card inserted into the module,
    a resilient latch arm, and
    a locking member to retain an inserted smart card in the module, wherein the biasing member is operable to eject a smart card from the module on release of the locking member, and wherein the locking member is mounted to the resilient latch arm.

2. A reader module according to claim 1, including a chassis having a chamber therein and a slot to enable insertion of a smart card into the chamber.

3. A reader module according to claim 2, wherein the chassis includes terminals for connection with corresponding terminals in an inserted smart card.

4. A reader module according to claim 1, wherein the biasing member includes an actuator and a spring, the arrangement being such that a partially inserted card contacts one end of the actuator, further insertion of the card causing the actuator to move with the card and thereby compress the spring to bias the card in a direction against the direction of insertion.

5. A reader module according to claim 4, wherein the actuator and spring are disposed in an elongate cavity in the chassis, said one end of the actuator protruding from the cavity into the chamber.

6. A reader module according to claim 5, wherein the spring is a compression spring.

7. A reader module according to claim 1, wherein the latch arm is resiliently deformed in response to the pressure of a card on the locking member during insertion, the locking member being deflected by the card to allow insertion thereof into the chamber.

8. A reader module according to claim 7, wherein the resilience of the latch arm returns the locking member to its original position when the pressure applied thereto by a card is removed.

9. A reader module according to claim 1, wherein the locking member comprises a release button and a card engaging arm extending laterally therefrom into the chamber.

10. A reader module according to claim 9, wherein the release button and the card engaging arm are unitary.

11. A reader module according to claim 9, wherein the locking member is deflected in response to pressure of a card on a leading edge of the card engaging arm during insertion.

12. A reader module according to claim 11, wherein the locking member is positioned in a cut out in the chassis.

13. A reader module according to claim 11, wherein the leading edge of the card engaging arm to which pressure is applied by a card is bevelled such that the card deflects the card engaging arm against the bias provided by the resiliently deformable latch arm to allow the card to pass over the card engaging arm during insertion.

14. A reader module according to claim 11, wherein the module is configured such that when a card has been fully inserted, it clears the card engaging arm, the resilience of the latch arm causing the locking member to return to its original position such that the card is retained in the module by the locking member.

15. A reader module according to claim 11, including a smart card having a chamfered corner portion, the card engaging portion having an angled card engaging face configured such that when the card is inserted and the chamfered corner clears the card engaging arm, the locking member returns to its original position such that the angled card engaging face engages the chamfered corner to lock the card in the module, the arrangement being such that the card does not clear the card engaging arm when inserted in any other orientation.

16. A reader module according to claim 15, wherein the smart card is a subscriber identification module (SIM).

17. A reader module according to claim 11, configured such that the resilient latch arm is deformed in response to pressure on the button to deflect the card engaging arm out of the chamber, thereby releasing the card from the module.

18. A reader module according to claim 17, wherein the biasing member partially ejects the card from the module on actuation of the button.

19. A reader module according to claim 1, including a cover plate mounted on the chassis.

20. A reader module according to claim 19, wherein the latch arm is integral with the cover plate.

21. A reader module according to claim 1, including mounts for mounting the module to an electronic device.

22. An electronic device incorporating a smart card reader module according to claim 1.

23. A mobile telephone communications device incorporating a smart card reader module according to claim 1.

24. A mobile telephone communications device according to claim 23, including a casing and a battery pack, a smart card being inserted into the module through an opening in the casing.

25. A mobile telephone communications device according to claim 24, wherein the battery pack blocks the opening when fitted and prevents release of an inserted card due to inadvertent operation of the locking member.

26. A mobile telephone communications device according to claim 24, wherein the locking member protrudes through the casing.

* * * * *